(12) United States Patent
Dooley et al.

(10) Patent No.: US 11,684,904 B2
(45) Date of Patent: Jun. 27, 2023

(54) INITIATOR INJECTION INTO HIGH PRESSURE LDPE REACTORS

(71) Applicant: Chevron Phillips Chemical Company LP, The Woodlands, TX (US)

(72) Inventors: Kenneth A. Dooley, Porter, TX (US); Corey W. Knight, Houston, TX (US); Ralph J. Price, Porter, TX (US); Joel A. Mutchler, Porter, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 17/501,032

(22) Filed: Oct. 14, 2021

(65) Prior Publication Data
US 2023/0122570 A1    Apr. 20, 2023

(51) Int. Cl.
*B01J 19/26*    (2006.01)
*B01J 19/24*    (2006.01)
(Continued)

(52) U.S. Cl.
CPC ........... *B01J 19/26* (2013.01); *B01J 19/0013* (2013.01); *B01J 19/248* (2013.01); *C08F 10/02* (2013.01); *B01J 2219/00051* (2013.01); *B01J 2219/00162* (2013.01); *B01J 2219/00164* (2013.01); *B01J 2219/182* (2013.01)

(58) Field of Classification Search
CPC .... B01J 19/00; B01J 19/0006; B01J 19/0013; B01J 19/24; B01J 19/248; B01J 19/26; B01J 2219/00; B01J 2219/00049; B01J 2219/00051; B01J 2219/00162; B01J 2219/00164; B01J 2219/182; C08F 10/00; C08F 10/02
See application file for complete search history.

(56) References Cited

U.S. PATENT DOCUMENTS

| 3,405,115 A | 10/1968 | Schappert |
| 6,677,408 B1 | 1/2004 | Maehling |

(Continued)

FOREIGN PATENT DOCUMENTS

| EP | 2239283 B1 | 1/2012 |
| EP | 2121592 B1 | 5/2012 |

(Continued)

OTHER PUBLICATIONS

IUPAC Compendium of Chemical Terminology, 2nd Ed. 1997, pp. 1-1670.

(Continued)

*Primary Examiner* — Natasha E Young
(74) *Attorney, Agent, or Firm* — Merchant & Gould P.C.

(57) ABSTRACT

Methods for operating a high pressure olefin polymerization reactor include the steps of introducing an initiator stream containing ethylene and an initiator compound through an initiator nozzle into the reactor, introducing an olefin stream containing ethylene and an optional comonomer through an olefin nozzle into the reactor, and polymerizing ethylene and optionally the comonomer in the presence of the initiator stream in the reactor under high pressure polymerization conditions to produce an ethylene polymer. The amount of ethylene in the initiator stream is from 0.01 to 2 wt. % of the amount of ethylene in the olefin stream. An injection nozzle that can be used in conjunction with the high pressure reactor also is described.

26 Claims, 2 Drawing Sheets

(51) Int. Cl.
*B01J 19/00* (2006.01)
*C08F 10/02* (2006.01)

(56) References Cited

U.S. PATENT DOCUMENTS 6,951,908 B2 10/2005 Groos
8,308,087 B2 11/2012 Berbee

FOREIGN PATENT DOCUMENTS

| EP | 2393587 B1 | 8/2020 |
|----|------------|--------|
| GB | 1569518 A | 6/1980 |
| WO | 2014190039 A1 | 11/2014 |
| WO | 2021074141 A1 | 4/2021 |

OTHER PUBLICATIONS

Kenneth A. Dooley, "Declaration of Kenneth A. Dooley," Jan. 26, 2022, 3 pages.

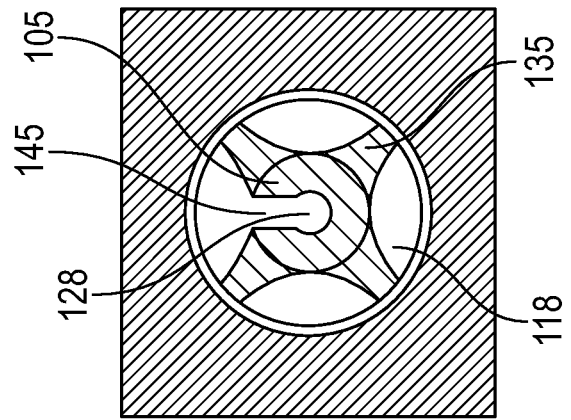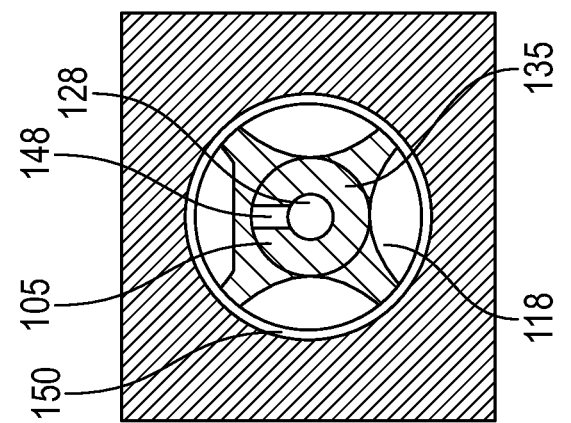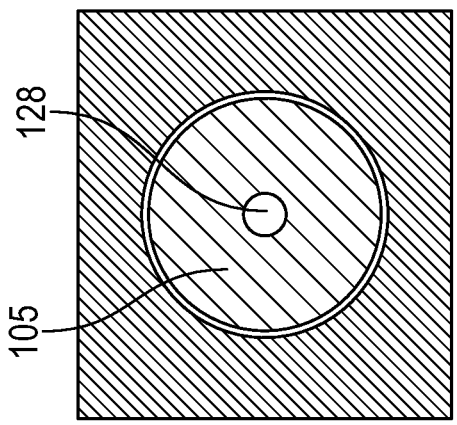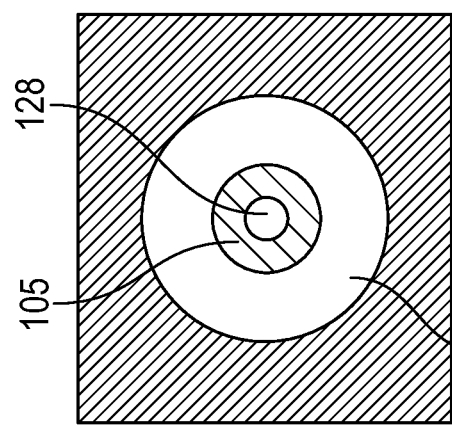

INITIATOR INJECTION INTO HIGH PRESSURE LDPE REACTORS

FIELD OF THE INVENTION

The present disclosure relates to methods and devices for introducing initiator streams and olefin streams into high pressure olefin polymerization reactors, and more particularly, relates to such methods and devices in which the exposure of stagnant initiator to high temperatures is minimized.

BACKGROUND OF THE INVENTION

Low density polyethylene (LDPE) and ethylene-based copolymers have been produced for many years using high pressure polymerization processes that can employ tubular reactors or autoclave reactors, which are operated at very high pressures and temperatures. Peroxide or other suitable initiators and olefin monomer/comonomer(s) are normally introduced to the reactor at several locations generally referred to as reaction zones.

In a particular reaction zone, the rate at which the initiator/peroxide is injected into the reaction zone is adjusted as needed to control the amount of reaction in each zone and the resulting temperature of the reactor contents within that particular zone. Also in consideration of the properties of the ethylene polymer being produced, it is not uncommon for maximum initiator injection rates to be as much as 20 times higher for certain reaction conditions and ethylene polymers than the minimum injection rates required under other reactor conditions and for other ethylene polymers. Moreover, there are instances where no initiator/peroxide flow is required in a particular reaction zone within the reactor. Such wide ranges in flow rates create a wide range of velocities in the initiator nozzle and discharge velocities into the reactor. Further, delivery systems for initiator/peroxide can create dead times in which the initiator/peroxide sits stagnant in a hot nozzle, leading to premature decomposition of the initiator/peroxide as well as plugging of the initiator nozzle.

Thus, there is a need for improved methods and devices for introducing initiator/peroxide streams into high pressure olefin polymerization reactors in order to overcome these deficiencies. Accordingly, it is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Methods for operating a high pressure olefin polymerization reactor, or in alternative terms, methods for performing a free radical olefin polymerization process, are described herein. One such method for operating a high pressure olefin polymerization reactor can comprise (a) introducing an initiator stream through an initiator nozzle into the reactor, the initiator stream comprising ethylene and an initiator compound, (b) introducing an olefin stream through an olefin nozzle into the reactor, the olefin stream comprising ethylene and optionally a comonomer, and (c) polymerizing ethylene and optionally the comonomer in the presence of the initiator stream in the reactor under high pressure polymerization conditions to produce an ethylene polymer. The amount of ethylene used in step (a) is a minor fraction of the amount of ethylene used in step (b). Generally, the amount of ethylene in the initiator stream based on the amount of ethylene in the olefin stream ranges from 0.01 to 2 wt. %.

Injection nozzles for introducing olefin streams into high pressure olefin polymerization reactors also are provided herein. Such injection nozzles can concurrently inject both olefins and initiators into the high pressure olefin polymerization reactors, and the initiator can be mixed with an olefin within the reactor wall prior to entering the reactor. For instance, a representative injection nozzle can comprise (i) a feed section comprising an inner flow channel directing a flow of an initiator stream, at least two outer flow channels directing flows of an olefin stream, and a center portion configured to prevent contacting of the initiator stream with the olefin stream, wherein the center portion is further configured to be in contact with a reactor bore (or housing) through a wall of a high pressure olefin polymerization reactor, and (ii) a mixing section comprising a diverting port in the center portion configured to divert a fraction of the olefin stream from at least one of the at least two outer flow channels to enter the inner flow channel and mix with the initiator stream.

A related polymerization reactor system also is encompassed herein, and this reactor system can comprise the high pressure olefin polymerization reactor and the injection nozzle described herein, and wherein the injection nozzle is integrated in the reactor bore (housing) and extends through the wall of the high pressure olefin polymerization reactor.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

BRIEF DESCRIPTION OF THE FIGURES

The following figures form part of the present specification and are included to further demonstrate certain aspects of the present invention. The invention may be better understood by reference to one or more of these figures in combination with the detailed description and examples.

FIGS. 1A-1E are cross-sectional views at sections 1A-1E, respectively, of FIG. 1.

DEFINITIONS

Figure 1:
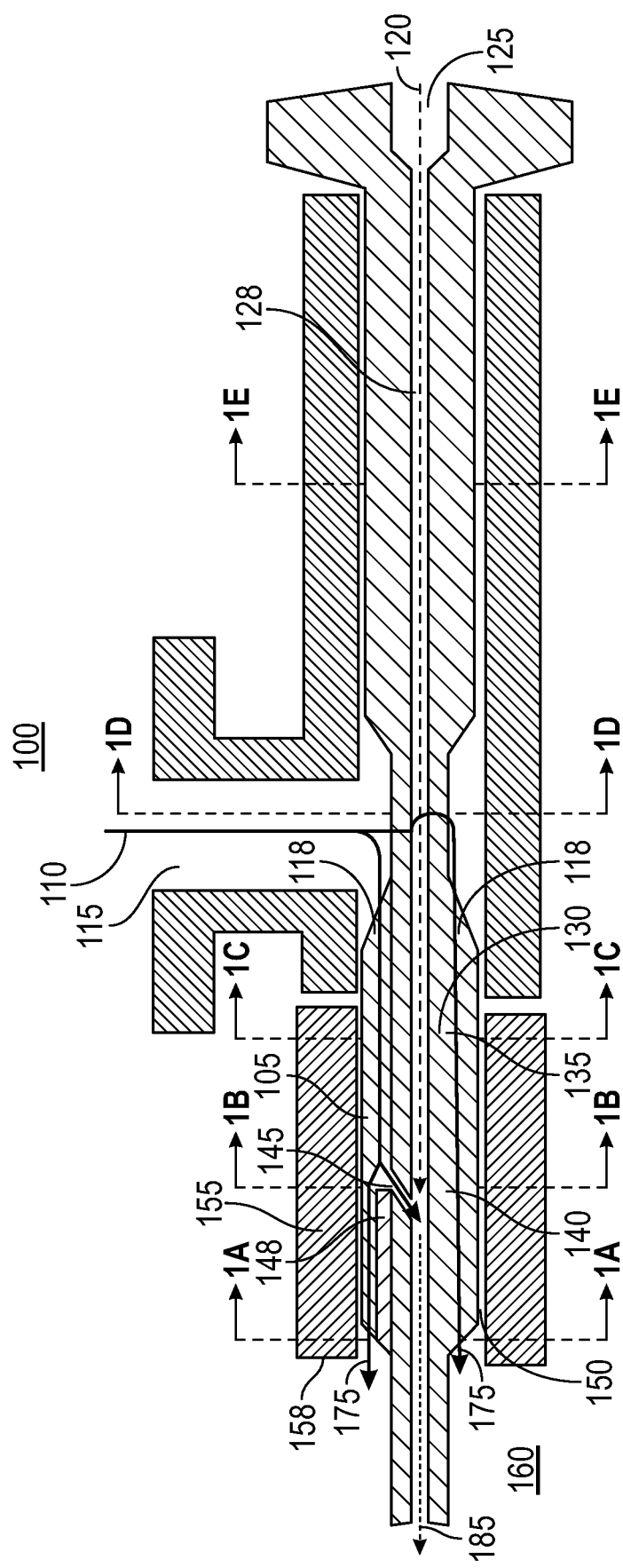
FIG. 1 illustrates an injection nozzle integrated into a high pressure olefin polymerization reactor consistent with an aspect of the present invention.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and each and every feature disclosed herein, all combinations that do not detrimentally affect the systems, compositions, devices, or methods described herein are contemplated with or without explicit description of the particular combination. Additionally, unless explicitly recited otherwise, any aspect or feature disclosed herein can be combined to describe inventive systems, compositions, devices, or methods consistent with the present disclosure.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

The term "hydrocarbon" whenever used in this specification and claims refers to a compound containing only carbon and hydrogen, whether saturated or unsaturated. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon).

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For instance, a general reference to pentane includes n-pentane, 2-methyl-butane, and 2,2-dimethylpropane; and a general reference to a butyl group includes a n-butyl group, a sec-butyl group, an iso-butyl group, and a t-butyl group.

The terms "contacting," "combining," and the like are used herein to describe systems, compositions, devices, and methods in which the materials are contacted or combined together in any order, in any manner, and for any length of time, unless otherwise specified. For example, the materials can be contacted or combined by blending, mixing, fluidizing, and the like, using any suitable technique.

The term "polymer" is used herein generically to include olefin homopolymers, copolymers, terpolymers, and the like, as well as alloys and blends thereof. The term "polymer" also includes impact, block, graft, random, and alternating copolymers. A copolymer can be derived from an olefin monomer and one comonomer, while a terpolymer can be derived from an olefin monomer and two comonomers. Accordingly, "polymer" encompasses copolymers and terpolymers. Similarly, the scope of the term "polymerization" includes homopolymerization, copolymerization, and terpolymerization. Therefore, an ethylene polymer includes ethylene homopolymers, ethylene copolymers, ethylene terpolymers, and the like, as well as blends or mixtures thereof. Thus, an ethylene polymer encompasses polymers often referred to in the art as LDPE (low density polyethylene). The term "polymer" also includes all possible geometrical configurations, if present and unless stated otherwise, and such configurations can include isotactic, syndiotactic, and random symmetries.

In this disclosure, while systems and methods are described in terms of "comprising" various components or steps, the systems and methods also can "consist essentially of" or "consist of" the various components or steps, unless stated otherwise.

The terms "a," "an," and "the" are intended to include plural alternatives, e.g., at least one. For instance, the disclosure of "a reactor" is meant to encompass one reactor, or combinations of more than one reactor, unless otherwise specified.

Various numerical ranges are disclosed herein. When a range of any type is disclosed or claimed, the intent is to disclose or claim individually each possible number that such a range could reasonably encompass, including end points of the range as well as any sub-ranges and combinations of sub-ranges encompassed therein, unless otherwise specified. As a representative example, the present disclosure recites that the linear velocity of the initiator stream through the initiator nozzle can be in certain ranges. By a disclosure that the linear velocity can be in a range from 5 to 25 ft/sec, the intent is to recite that the linear velocity can be any linear velocity in the range and, for example, can include any range or combination of ranges from 5 to 25 ft/sec, such as from 10 to 20 ft/sec, from 5 to 18 ft/sec, or from 7 to 16 ft/sec, and so forth. Likewise, all other ranges disclosed herein should be interpreted in a manner similar to this example.

In general, an amount, size, formulation, parameter, range, or other quantity or characteristic is "about" or "approximately" whether or not expressly stated to be such. Whether or not modified by the term "about" or "approximately," the claims include equivalents to the quantities or characteristics.

Although any methods, systems, steps, and components similar or equivalent to those described herein can be used in the practice or testing of the invention, the typical methods, systems, steps, and components are herein described.

All publications and patents mentioned herein are incorporated herein by reference in their entirety for the purpose of describing and disclosing, for example, the constructs and methodologies that are described in the publications and patents, which might be used in connection with the presently described invention.

DETAILED DESCRIPTION OF THE INVENTION

Disclosed herein are methods for operating a high pressure olefin polymerization reactor in which an initiator stream (containing ethylene and an initiator compound) is introduced through an initiator nozzle into the reactor, an olefin stream (containing ethylene and optionally a comonomer) is introduced through an olefin nozzle into the reactor, and polymerizing in the reactor under high pressure polymerization conditions to produce an ethylene polymer. Generally, the amount of ethylene used in the initiator stream based on the amount of ethylene in the olefin stream is less than 2 wt. %, and more often less than 0.5-1 wt. %.

A benefit of the disclosed methods is improved mixing and dispersion of the initiator (e.g., peroxide) in the reactor, thereby improving safe operation (reducing the potential for experiencing decomposition reactions) and overall reactor temperature control. Another benefit is a substantially continuous flow of olefin (e.g., ethylene) through the initiator nozzle even during times when initiator injection is not occurring, making it less likely to foul or plug the nozzle with polymer from within the reactor itself, as well as minimizing the time with which the initiator is exposed to elevated temperatures and potential decomposition. Another benefit is a high linear velocity of the initiator stream within the initiator nozzle and during discharge into the reactor, which helps prevent nozzle plugging, reduces residence time at elevated temperatures within the nozzle, and provides better distribution of the initiator in the bulk reaction mixture within the reactor itself.

Advantageously, the disclosed methods provide a constant sweep of the initiator nozzle with ethylene and provide a more constant discharge velocity of the initiator stream into the reactor. A very small amount of ethylene is mixed with the normal initiator flow stream (even at low initiator flow rates), preventing stagnant initiator and decomposition during intermittent injection and providing a more constant velocity out of the nozzle over a wide range of initiator flow rates. When an initiator injector becomes stagnant, ethylene tends to flow back in the nozzle and the adverse reactions that can occur include the disassociation of the peroxide, polymerization with ethylene, and decomposition of ethylene.

As discussed herein, the disclosed methods provide a more constant velocity in the nozzle and at the tip of the nozzle, regardless of the variation in initiator flow rates. Different velocities can lead to poor mixing with the circulating reaction mixture in the reactor, especially reaction conditions requiring low initiator flow rates where the initiator is essentially dripping into the reactor at a very low velocity. By introducing a flow of ethylene, the velocity within the nozzle and discharging from the nozzle and into the reactor is more constant and more uniform across the stirring currents in the reactor. More ethylene flow is used at low initiator rates and less ethylene flow is used at high initiator rates.

In sum, the disclosed methods improve initiator efficiencies by minimizing side reactions with the diluent, provide more consistent initiator injection velocity over large ranges of initiator injection rates, minimize the contact time between the hot reactor walls and the initiator to reduce pre-initiation of the initiator within the nozzle, improve distribution of initiator across the reaction zone, minimize the potential to plug initiator nozzles, and achieve more uniform distribution of temperature across the reaction zone.

Also disclosed herein are injection nozzles for introducing olefin streams into high pressure olefin polymerization reactors. These injection nozzles can concurrently inject both olefins and initiators into the high pressure olefin polymerization reactors, and the initiator can be mixed with an olefin within the reactor wall prior to entering the reactor. The injection nozzle can comprise (i) a feed section comprising an inner flow channel directing a flow of an initiator stream, at least two outer flow channels directing flows of an olefin stream, and a center portion configured to prevent contacting of the initiator stream with the olefin stream, wherein the center portion is further configured to be in contact with a reactor bore (or housing) through a wall of a high pressure olefin polymerization reactor, and (ii) a mixing section comprising a diverting port in the center portion configured to divert a fraction of the olefin stream from at least one of the at least two outer flow channels to enter the inner flow channel and mix with the initiator stream.

The olefin injection nozzle also provides many of the benefits and advantages discussed hereinabove for the method using the initiator nozzle. A fraction of the large olefin stream in the injection nozzle is mixed with the initiator stream and the resulting mixture is discharged into the reactor concurrently with the large olefin stream. Minimizing the contact time between the hot reactor walls and the initiator to reduce pre-initiation of the initiator within the injection nozzle, improving distribution of the initiator across the reaction zone, achieving more uniform distribution of temperature across the reaction zone, and reducing residence time by flowing the mixed ethylene/initiator stream at high linear velocities within the injection nozzle in the reactor wall are but a few benefits and advantages of the disclosed injection nozzles.

Methods for Operating High Pressure Reactors

Aspects of this invention are directed to methods for operating a high pressure olefin polymerization reactor (or to methods for performing a free radical olefin polymerization process). Herein, a method for operating a high pressure olefin polymerization reactor can comprise (a) introducing an initiator stream through an initiator nozzle into the reactor, the initiator stream comprising ethylene and an initiator compound, (b) introducing an olefin stream through an olefin nozzle into the reactor, the olefin stream comprising ethylene and optionally a comonomer, and (c) polymerizing ethylene and optionally the comonomer in the presence of the initiator stream in the reactor under high pressure polymerization conditions to produce an ethylene polymer. The amount of ethylene in the initiator stream based on the amount of ethylene in the olefin stream typically ranges from 0.01 to 2 wt. %. More often, the amount of ethylene in the initiator stream—based on the amount of ethylene in the olefin stream—falls within a range from 0.01 to 1 wt. %, from 0.2 to 1 wt. %, from 0.01 to 0.5 wt. %, or from 0.05 to 0.2 wt. %. This ratio is calculated from the amount of ethylene in the initiator stream that flows through one initiator nozzle (per time period, such as per hr) based on the total ethylene entering the reactor (per time period, such as per hr). Thus, if the polymerization reactor has only one initiator nozzle, the ratio would be in the 0.01 to 2 wt. % range, based on total ethylene entering the reactor, and if the polymerization reactor has four initiator nozzles, the ratio in each nozzle would be in the 0.01 to 2 wt. % range, based on total ethylene entering the reactor.

Generally, the features of the methods for operating a high pressure olefin polymerization reactor (e.g., the features of the initiator stream and the initiator compound, the features of the olefin stream and optional comonomer, the features of the high pressure polymerization, and the relative amount of ethylene in the initiator stream versus the total ethylene, among others) are independently described herein and these features can be combined in any combination to further describe the disclosed methods for operating high pressure olefin polymerization reactors. Moreover, additional process steps can be performed before, during, and/or after the steps of these methods, and can be utilized without limitation and in any combination to further describe the methods for operating high pressure olefin polymerization reactors, unless stated otherwise.

Referring first to step (a), the initiator stream is introduced into the reactor through an initiator nozzle. The initiator nozzle also can be referred to as an initiator inlet or an initiator quill. The initiator stream contains ethylene and an initiator compound, and generally, ethylene and the initiator compound are mixed or combined outside of the reactor and then fed together into the reactor. Beneficially, the ethylene and the initiator compound are mixed as close to the reactor wall as possible. Any ethylene source can be used, but it can be advantageous to use an ethylene slip stream from the high pressure olefin stream that is being fed into the reactor through the olefin nozzle.

Although not required, the initiator compound often has a carrier, referred to herein as a diluent. Thus, the initiator stream can comprises an initiator mixture, which contains the initiator compound and the diluent. The initiator mixture can contain a wide range of amounts of the initiator compound, and representative amounts include from 0.5 to 40 wt. %, from 1 to 35 wt. %, from 2 to 25 wt. %, or from 3 to 20 wt. % of the initiator compound, based on the total weight of the initiator mixture. If more than initiator compound is used, this weight percentage is based on the total weight of initiator compounds. The initiator mixture can be a solution or a slurry.

The initiator compound can comprise any suitable free radical initiator, and often, the initiator compound can comprise one or more suitable peroxide compounds. For instance, the initiator compound can comprise one or more of 2,5-dimethyl-2,5-di(t-butylperoxy)hexane, dicumyl peroxide, t-butyl cumyl peroxide, n-butyl-4,4'-di(t-butylperoxy)valerate, and the like. Other representative and non-limiting examples of initiator compounds that can be utilized herein can include hydrogen peroxide, di-t-butyl peroxide, diethyl peroxide, methylethyl ketone peroxide, t-butyl hydroperoxide, acetyl peroxide, benzoyl peroxide, dioctanoyl peroxide, succinic acid peroxide, 3-hydroxy-1,1-dimethylbutyl peroxy neodecanoate, di(2-ethylhexyl) peroxy dicarbonate, di(n-propyl) peroxy dicarbonate, di(sec-butyl) peroxy dicarbonate, t-butyl peroxy neoheptanoate, t-amyl peroxy pivalate, t-butyl peroxy pivalate, diisononanoyl peroxide, didodecanoyl peroxide, and the like, as well as combinations thereof. Additional suitable peroxide initiator compounds include t-butyl-peroxy neodecanoate, t-butyl-peroxyoctoate, t-butyl-peroxyacetate, and t-amyl analogues of these peroxide compounds, as well as combinations thereof. In addition to peroxide compounds, other suitable initiator compounds include azo-compounds and oxygen.

The diluent component of the initiator mixture generally comprises a suitable hydrocarbon compound, such as toluene, benzene, hexane, cyclohexane, heptane, cycloheptane, octane, decane, and/or dodecane, as well as mineral oils and mineral spirits. The diluent component can comprise a mixture of alkanes in any suitable carbon number range, such as $C_6$-$C_{14}$ or $C_9$-$C_{12}$ alkanes.

Typically, the initiator stream is fed through the initiator nozzle at a relatively high velocity to minimize exposure to elevated temperatures and areas of stagnation. In one aspect, for example, the linear velocity of the initiator stream (which can contain ethylene, the initiator compound, and the diluent) through the initiator nozzle can be in a range from 5 to 25 ft/sec. In another aspect, the linear velocity of the initiator stream through the initiator nozzle can be in a range from 10 to 20 ft/sec, while in yet another aspect, the linear velocity can range from 5 to 18 ft/sec, and in still another aspect, the linear velocity can range from 7 to 16 ft/sec.

The mass flow rate of the initiator stream (which can contain ethylene, the initiator compound, and the diluent) through the initiator nozzle can vary, of course, on the size and production rate of the high pressure olefin polymerization reactor. Nonetheless, the mass flow rate of the initiator stream through the initiator nozzle often ranges from 5 to 500 lb/hr, such as from 20 to 200 lb/hr, or from 5 to 50 lb/hr. As noted above, the initiator compound injection amount and accompanying ethylene amount in the initiator stream are a very minor fraction of the overall ethylene addition into the high pressure olefin polymerization reactor.

In addition to the initiator compound and optional diluent, the initiator stream often contains from 10 to 99 wt. % ethylene, based on the total initiator stream. Other typical ranges for the amount of ethylene in the initiator stream include from 15 to 90 wt. %, from 20 to 80 wt. %, or from 70 to 98 wt. % ethylene, based on the total weight of the initiator stream. These weight percent ranges are based on an average over a 5 min time interval. As one of skill in the art would readily recognize, the initiator/diluent feed portion of the initiator stream is intermittent (delivery pump is a double acting plunger), while the ethylene feed portion of the initiator stream is continuous. Beneficially, this constant ethylene flow can prevent the initiator compound from becoming stagnant in the initiator nozzle.

In an aspect, the flow of the initiator compound through the initiator nozzle is intermittent (or pulsing), and a period of time in which there is no flow of the initiator compound through the initiator nozzle is less than or equal to 5 sec, and more often, less than or equal to 3 sec, less than or equal to 1 sec, or less than or equal to 0.5 sec. It is generally desirable to have any period of no flow to be a maximum of 1 sec, and preferably less.

Also beneficially, if the production of a particular grade of ethylene polymer does not require initiator at a particular injection point where the injection nozzle is located, then the ethylene provided in the initiator stream (in this case, with no initiator) will keep the nozzle from plugging with polymer from inside the reactor by keeping a steady flow of an ethylene stream through the nozzle.

In step (a), the temperature of the ethylene (or the initiator stream) is relatively low to prevent any polymerization from occurring in the initiator nozzle. Often, the temperature of the ethylene (or the initiator stream) in step (a) falls within a range from 5 to 95° C., such as from 15 to 80° C., from 20 to 70° C., or from 20 to 60° C., and the like. The cold ethylene (or cold initiator stream)—in combination with the short residence time in the nozzle due to the ethylene sweep—prevents decomposition of the initiator compound, e.g., the peroxide compound, prior to entering the reactor.

Referring now to step (b), an olefin stream is introduced into the reactor through an olefin nozzle. The olefin nozzle also can be referred to as an olefin inlet or an olefin feed port. Depending upon the reactor configuration, there can be, and often are, multiple olefin nozzles at particular locations along the reactor. The olefin stream contains ethylene and optionally a comonomer.

In step (c), ethylene and the comonomer (if present) are polymerized in the presence of the initiator stream (free radical polymerization using the initiator compound) in the reactor under high pressure polymerization conditions to produce the ethylene polymer. In some aspects, no comonomer is present in step (b)—or step (c)—of the method for operating a high pressure olefin polymerization reactor. In this case, the ethylene polymer is an ethylene homopolymer, which is often referred to in the art as low density polyethylene (LDPE) or high pressure LDPE. For homopolymer LDPEs, the density is typically in the range of 0.91 to 0.935 $g/cm^3$, such as from 0.915 to 0.93 $g/cm^3$, or from 0.916 to 0.928 $g/cm^3$, and the like.

In some aspects, the comonomer is present in step (b) and step (c), while in other aspects, the comonomer is present in step (c), but the comonomer is introduced into the reactor separately from the ethylene feed. When present in the reactor, any suitable comonomer can be used, such as acrylic acid, methyl acrylate, ethyl acrylate, butyl acrylate, vinyl acetate, carbon monoxide, propylene, butene, and the like, or any combination thereof. The comonomer content in the resultant ethylene polymer is not particularly limited, but often can range from any amount greater than zero up to about 30 mol % of the comonomer.

The high pressure polymerization conditions in step (c) include polymerization pressures from 10,000 psig (69 MPa) up to 50,000 psig (345 MPa). Other representative ranges for the polymerization pressure include from 10,000 to 35,000 psig (from 69 to 241 MPa), or from 15,000 to 28,000 psig (from 103 MPa to 193 MPa), and the like. The high pressure polymerization conditions in step (c) also include polymerization temperatures that fall within a range from 125 to 350° C. Other representative ranges for the polymerization temperature include from 150 to 315° C., or from 165 to 315° C., and the like. In an autoclave reactor, for instance, there are generally lower temperatures at the top (or inlet) of the reactor, and higher temperatures at the bottom (or discharge) of the reactor.

The polymerizing in step (c) often can be performed in the presence of a chain transfer agent. Representative and non-limiting examples of chain transfer agents include propane, isobutane, acetone, methyl ethyl ketone, and the like. Often, the chain transfer agent can be added to the reactor through an olefin nozzle and part of the olefin feed stream. Additionally or alternatively, the polymerizing in step (c) can be performed in the presence of an inhibitor, non-limiting examples of which include 2,6-di-t-butyl-4-methyl phenol, 2,6-di-t-butyl-4-ethyl phenol, 3,5-xylenol, 4,4-methylenebis (2,6-di-t-butyl phenol), and the like. An inhibitor can be used to reduce gels and to improve clarity, haze, and gloss in polymer film applications. Combinations of two or more chain transfer agents and/or two or more inhibitors can be used.

The methods disclosed herein are applicable to aspects where the high pressure olefin polymerization reactor is an autoclave reactor, or a tubular reactor, or a combination of a tubular reactor and an autoclave reactor. In a particular aspect of this invention, the high pressure olefin polymerization reactor is an autoclave reactor. The autoclave reactor can have any suitable L/D ratio—where L is the length of the reaction zone of the autoclave reactor, and D is the internal or inside diameter of the autoclave reactor. For example, the L/D of the autoclave reactor can be in a range from 1.5 to 15:1; alternatively, from 5:1 to 15:1; or alternatively, or from 6:1 to 12:1.

The methods disclosed herein also are applicable to a wide range of reactor sizes and related production rates. In one aspect, the method for operating a high pressure polymerization reactor can further comprise a step of discharging from 5 to 60 MT/hr of the ethylene polymer from the reactor, while in another aspect, the discharge rate can range from 5 to 20 MT/hr, and in yet another aspect, the discharge rate can range from 10 to 35 MT/hr.

In some aspects, the ethylene polymer can be continuously discharged from the reactor, while in other aspects, the ethylene polymer can be discontinuously discharged (e.g., pulsed discharge) from the reactor. Regarding the latter, the use of a pulsed discharge can improve heat transfer in a tubular reactor; the pressure drop during the periods of polymer discharge helps prevent reactor fouling.

The methods disclosed herein also are applicable to reactor configurations that contain only one initiator nozzle and only one olefin nozzle, only one initiator nozzle and two or more olefin nozzles, two or more initiator nozzles and only one olefin nozzle, and two or more initiator nozzles and two or more olefin nozzles. Likewise, the methods disclosed herein also encompass reactors that contain only one reaction zone and reactors that contain two or more reaction zones (e.g., 2-8 reaction zones or 4-6 reaction zones). In multizone reactors, the temperature in each reaction zone can be independent of the temperature in the other reaction zone(s). Additionally or alternatively, in multizone reactors, at least two reaction zones can contain an initiator nozzle, or each reaction zone in the reactor can contain an initiator nozzle.

Injection Nozzles and Reactor Systems

An injection nozzle consistent with aspects of the present invention can comprise (i) a feed section comprising an inner flow channel directing a flow of an initiator stream, at least two outer flow channels directing flows of an olefin stream, and a center portion configured to prevent contacting of the initiator stream with the olefin stream, wherein the center portion is further configured to be in contact with a reactor bore (housing) through a wall of a high pressure olefin polymerization reactor, and (ii) a mixing section comprising a diverting port in the center portion configured to divert a fraction of the olefin stream from at least one of the at least two outer flow channels to enter the inner flow channel and mix with the initiator stream. This injection nozzle also can be referred to as a mixing nozzle, since the initiator stream is mixed with a fraction of the olefin stream—within the reactor wall—to provide better initiator (e.g., peroxide) distribution when discharged into the interior of the reactor.

For multizone reactors, there can be several olefin injection nozzles (e.g., 3-6 injection nozzles), since these injection nozzles can be used as the main point of entry for the olefin stream, even though minor amounts of the initiator also are discharged into the reactor using these nozzles. While this can vary considerably based on reactor sizes and production rates, each injection nozzle often can accommodate olefin stream feed rates of from 5,000 to 50,000 lb/hr, from 5,000 to 25,000 lb/hr, or from 10,000 to 30,000 lb/hr. Moreover, this injection nozzle can be utilized in step (b) of the method for operating a high pressure olefin polymerization process, described hereinabove, to introduce an olefin stream into the reactor, but additionally, to introduce an initiator stream into the reactor through the same nozzle.

In the feed section of the injection nozzle, the cross-sectional area ratio of the at least two outer flow channels to the inner flow channel often falls within a range from 10:1 to 150:1, from 15:1 to 80:1, from 15:1 to 50:1, or from 20:1 to 60:1, and the like, although not necessarily limited thereto. Additionally or alternatively, the cross-sectional area ratio of the at least two outer flow channels in the feed section to the diverting port in the mixing section can range from 15:1 to 150:1, such as from 15:1 to 80:1, from 20:1 to 75:1, or from 25:1 to 55:1, and the like. While not required, generally the injection nozzle is oriented such that the outer flow channel that feeds the diverting port is above (or vertically above) the inner flow channel.

To assist the diversion of the fraction of the olefin stream from at least one of the at least two outer flow channels into the diverting port, and ultimately into the inner flow channel, the injection nozzle can further include a flow obstruction, which is configured to divert the fraction of the olefin stream into the diverting port. Any suitable flow obstruction can be used, but conveniently a dam can be present in a portion of one of the outer flow channels, and the dam can divert the flow of the fraction of the olefin stream into the diverting port.

When a flow obstruction is used, the cross-sectional area ratio of the at least two outer flow channels in the feed section to the area of the flow obstruction (e.g., a dam) in the mixing section can range from 4:1 to 25:1, although not limited thereto. Other suitable ranges for the cross-sectional area ratio of the at least two outer flow channels in the feed section to the area of the flow obstruction in the mixing section can include from 4:1 to 15:1, from 5:1 to 20:1, or from 6:1 to 12:1, and the like.

The portion of the olefin stream that exits the diverting port and enters the inner flow channel does so at an acute angle, often in the range of 15 to 90°. More often, the portion of the olefin stream exiting the diverting port enters the inner flow channel at an angle in a range from 15 to 75°; alternatively, from 15 to 60°; alternatively, from 25 to 60°; or alternatively, from 25 to 500.

In use, the injection nozzle is generally further configured to discharge the olefin stream into the high pressure olefin polymerization reactor after the mixing section, and further configured to discharge a mixture of the fraction of the olefin stream and the initiator stream from the inner flow channel into the high pressure olefin polymerization reactor after the mixing section. To promote uniform mixing in the high pressure olefin polymerization reactor, the discharge velocities from the injection nozzle are relatively high. In one aspect, the injection nozzle is configured to discharge the olefin stream and to discharge the mixture of the fraction of the olefin stream and the initiator stream into the high pressure olefin polymerization, independently, at a linear velocity of from 5 to 60 ft/sec in one aspect, from 10 to 55 ft/sec in another aspect, and from 15 to 50 ft/sec in yet another aspect.

For an individual injection nozzle, based on the geometric features of the injection nozzle disclosed herein, the injection nozzle is configured for a mass flow rate ratio of a total flow rate of the olefin stream in the feed section to a flow rate of the fraction of the olefin stream in the diverting port that can range from 30:1 to 400:1. In other aspects, this mass flow rate ratio can range from 30:1 to 150:1; alternatively, from 35:1 to 100:1; or alternatively, from 35:1 to 80:1.

Also based on the geometric features of the injection nozzle disclosed herein, the injection nozzle can be further configured for a pressure drop across the injection nozzle for the outer flow channels that is greater than for the inner flow channel by at least 15 psig and up to 250 psig. Thus, the pressure drop differential can be at least 15 psig, at least 20 psig, at least 50 psig, or at least 100 psig, and less than or equal to 250 psig, less than or equal to 200 psig, or less than or equal to 150 psig.

Also encompassed herein are polymerization reactor systems that comprise the high pressure olefin polymerization reactor and the injection nozzle described herein, wherein the injection nozzle is integrated in the reactor bore (housing) and extends through the wall of the high pressure olefin polymerization reactor.

The polymerization reactor system can further include, in aspects of this invention, an initiator feed port that is in communication with the inner flow channel, and in which the initiator feed port introduces the flow of the initiator stream into the inner flow channel. Likewise, the polymerization reactor system can further include an olefin feed port that is in communication with the at least two outer flow channels, and in which the olefin feed port introduces the flows of the olefin stream into the at least two outer flow channels.

While not a requirement, the injection nozzle can be further configured to introduce the olefin stream flush with an inner wall of the high pressure olefin polymerization reactor. Hence, this section of the injection nozzle does not extend into the reactor. Also, while not a requirement, the injection nozzle can be further configured to introduce the initiator stream from flush with an inner wall of the high pressure olefin polymerization reactor up to a distance within the reactor up to 15% (or up to 10%, or up to 5%) of the radius of the reactor. For instance, for a 27-inch ID reactor, an injection point 2 inches within the reactor translates to approximately 15%.

Referring now to FIG. 1, which illustrates a polymerization reactor system 100 consistent with an aspect of the present invention. The reactor system 100 includes a high pressure olefin polymerization reactor, of which only certain sections are illustrated in FIG. 1: a reactor wall 155, a reactor bore or housing 150, an inside wall of the reactor 158, and an interior of the reactor 160. The reactor system include an injection nozzle 105, which is integrated in the reactor bore or housing 150 and extends through the reactor wall 155 of the reactor. Outside of the reactor wall 155, there is an initiator feed port 125, which introduces a flow of an initiator stream 120 into an inner flow channel 128 of the injection nozzle 105. FIG. 1E is cross-sectional view at section 1E in FIG. 1 and illustrates a typical central location of the inner flow channel 128 within the injection nozzle 105.

Also on the outside of the reactor wall 155, there is an olefin feed port 115, which introduces a flow of an olefin stream 110 into outer flow channel(s) 118 of the injection nozzle 105. FIG. 1D and FIG. 1C are cross-sectional views at section 1D and 1C in FIG. 1, respectively, and FIG. 1D illustrates annular and non-contacting inner flow channel 128 and outer flow channel 118 at the olefin feed port 115. FIG. 1C illustrates a cross-section in a feed section 130 of the initiator nozzle 105 that is within the reactor wall 155 of the reactor. The inner flow channel 128, the four outer flow channels 118, and a center portion 135—which prevents the initiator stream 120 (in the inner flow channel 128) from contacting the olefin stream 110 (in the outer flow channels 118), and which is in contact with the reactor bore or housing 150 of the reactor wall 155—also are illustrated in the feed section 130 of FIG. 1C. These figures show four outer flow channels 118, but the invention is not limited thereto, so long as there are at least two outer flow channels 118.

Referring now to FIG. 1 and FIG. 1B, which is a cross-sectional view at section 1, the injection nozzle 105 has a mixing section 140 that includes a diverting port 145 in the center portion 135. The diverting port 145 diverts a fraction of the olefin stream 110 from one of the outer flow channels 118 and this fraction enters the inner flow channel 128 and mixes with the initiator stream 120. A flow obstruction 148, such as a dam, helps divert the fraction of the olefin stream 110 into the diverting port 145.

FIG. 1A is a cross-sectional view at section 1A, and is nearest the interior of the reactor 160 and the inside wall of the reactor 158. The inner flow channel 128, the four outer flow channels 118, the center portion 135, the flow obstruction 148, and the reactor bore or housing 150 of the reactor wall are illustrated in FIG. 1A. The injection nozzle 105, as shown in FIG. 1, also discharges the olefin stream 175 into the interior of the reactor 160, and at a point that is generally flush with the inside wall of the reactor 158. The injection nozzle 105 also discharges a mixture 185 (of the fraction of the olefin stream and the initiator stream) into the interior of the reactor 160, and at a point that is any suitable distance within the reactor interior (or alternatively, the mixture 185 can be discharged flush with the inside wall of the reactor 158).

EXAMPLES

The invention is further illustrated by the following examples, which are not to be construed in any way as imposing limitations to the scope of this invention. Various other aspects, modifications, and equivalents thereof, which after reading the description herein, can suggest themselves to one of ordinary skill in the art without departing from the spirit of the present invention or the scope of the appended claims.

Example 1

The high pressure LDPE polymerization experiment of Example 1 was performed in an autoclave reactor with four zones and a L/D of 7.5. The reactor was equipped with three initiator nozzles and three olefin nozzles. In the experiment, no comonomer was used, only ethylene. Polymerization pressure was approximately 24,000 psig and polymerization temperature ranged from 230 to 300° C. amongst the reaction zones. A LDPE with a nominal melt index of 5 g/10 min and a nominal density of 0.922 g/cc was produced in the reactor.

The diluent in the initiator streams was odorless mineral spirits (mixture of $C_9$ to $C_{12}$ alkanes) and the initiator compounds were t-butyl-peroxyoctoate, t-butyl-peroxyacetate and di-t-butylperoxide. The amount of the initiator compounds were 15 wt. %, 3 wt. % and 1 wt. %, respectively, based on the total weight of the diluent and the initiator compounds. One of the initiator nozzles was being operated without initiator or diluent flow, but the small ethylene stream (100% ethylene) was still introduced to the initiator nozzle to keep the velocity in the initiator nozzle within the ranges specified below. Initiator streams (containing ethylene, diluent, and initiator compounds) were introduced to the other two initiator nozzles. The amount of ethylene in these initiator streams in the initiator nozzles was between 85 and 95 wt. %, based on the total weight of the diluent, initiator compounds, and ethylene in the initiator stream. The temperature of the ethylene (and the initiator stream) in the initiator nozzle was 30° C. Linear velocity of the initiator stream through the initiator nozzle and for discharge into the reactor was from 8 to 15 ft/sec for the three initiator nozzles. Each initiator nozzle utilized an amount of ethylene in the initiator stream, based on total ethylene feed to the reactor, in a range from 0.07 to 0.1 wt. %. Mass flow rates of the initiator stream through the initiator nozzle for each initiator nozzle were approximately 8 to 22 lb/hr. The flows of the initiator/diluent feed portion of the initiator streams through the initiator nozzles were intermittent (or pulsing), while the ethylene feed portions were continuous. The period of time in which there were no flows of the initiator/diluent portions to the initiator nozzles was between 0.6 and 2 sec.

Beneficially, the constant ethylene flows to the initiator streams prevented the initiator compounds from becoming stagnant in the initiator nozzles and assured constant injection velocities in the initiator nozzles that exceeded 5 ft/sec. By preventing the initiator compounds from becoming stagnant in the initiator nozzles, the reactor was safely operated without experiencing decomposition reactions and the overall temperature control was excellent. The reactor was operated in this manner without experiencing fouling or plugging of the initiator nozzles. The higher velocities in the initiator nozzles also provided better distribution of the initiator compounds into the bulk reaction mixture within the reactor itself.

Comparative Example 2

The high pressure LDPE polymerization experiment of Comparative Example 2 was performed in an autoclave reactor with four zones and a L/D of 7.5. The reactor was equipped with three initiator nozzles and three olefin nozzles. In the experiment, no comonomer was used, only ethylene. Polymerization pressure was approximately 23,000 psig and polymerization temperature ranged from 240 to 300° C. amongst the reaction zones. A LDPE with a nominal melt index of 7 g/10 min and a nominal density of 0.917 g/cc was produced in the reactor.

The diluent in the initiator streams was odorless mineral spirits (mixture of $C_9$ to $C_{12}$ alkanes) and the initiator compounds were t-butyl-peroxyacetate and di-t-butylperoxide. The amount of the initiator compounds were 3 wt. % and 1 wt. %, respectively, based on the total weight of the diluent and the initiator compounds. One of the initiator nozzles was being operated without initiator or diluent flow. No olefin/ethylene was added to the initiator streams in this comparative example. The average linear velocity of the initiator streams through the initiator nozzle and for discharge into the reactor was from 8 to 15 ft/sec. Mass flow rates of the initiator stream through the initiator nozzle for each initiator nozzle were approximately 1.5 to 20 lb/hr. The flows of the initiator streams through the initiator nozzles were intermittent (or pulsing). The period of time in which there were no flows of the initiator streams to the initiator nozzles was between 1.8 and 8 sec.

The initiator stream was stagnant in the initiator nozzles for between 1.8 and 8 sec and resulted in velocities in the initiator nozzles ranging from 0 to 3 ft/sec. After about 4 days under these conditions, the reactor experienced a runaway, decomposition reaction. In addition, the initiator nozzle in which no initiator stream was being introduced was found plugged with polymer and decomposition products throughout the injection nozzle, indicating that the nozzle was experiencing polymerization and decomposition before the reactor decomposition occurred.

Example 3

The polymerization experiment of Example 3 was conducted in a manner similar to Example 1. The autoclave reactor was equipped with an olefin injection nozzle as described herein and generally represented in FIG. 1. The injection nozzle was integrated in a reactor bore (housing) and extended through the wall of the reactor.

Referring to the injection nozzle, the cross-sectional area ratio of the four outer flow channels to the inner flow channel in the feed section was 30:1-35:1, the cross-sectional area ratio of the four outer flow channels in the feed section to the diverting port in the mixing section was 30:1-35:1, and the cross-sectional area ratio of the four outer flow channels in the feed section to the area of the flow obstruction in the mixing section was 6:1-10:1. The fraction of the olefin (ethylene) stream that exited the diverting port entered the inner flow channel at an angle of approximately 30°.

In operation, the mass flow rate ratio of the total flow rate of the olefin (ethylene) stream in the feed section to the flow rate of the fraction of the olefin stream in the diverting port was between 50:1 and 60:1. The pressure drop across the injection nozzle for the outer flow channels was greater than for the inner flow channel by approximately 20 psig.

The injection nozzle discharged the olefin (ethylene) stream and discharged the mixture of the fraction of the olefin stream and the initiator stream reactor at a linear velocity of from 20 to 45 ft/sec, and the olefin (ethylene) stream discharge was flush with the inner wall of the reactor. The initiator stream (with ethylene) was discharged into the reactor at a distance into the reactor of 8-14% of the radius of the reactor.

Beneficially, the constant ethylene flow mixing with the initiator stream assured constant injection velocities of the initiator compounds that exceeded 20 ft/sec. The reactor was safely operated without experiencing decomposition reactions and the overall temperature control was excellent. The higher velocities thru the nozzle and into the reactor also provided better distribution of the initiator compounds into the bulk reaction mixture within the reactor itself.

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A method for operating a high pressure olefin polymerization reactor, the method comprising:

(a) introducing an initiator stream through an initiator nozzle into the reactor, the initiator stream comprising ethylene and an initiator compound;

(b) introducing an olefin stream through an olefin nozzle into the reactor, the olefin stream comprising ethylene and optionally a comonomer; and (c) polymerizing ethylene and optionally the comonomer in the presence of the initiator stream in the reactor under high pressure polymerization conditions to produce an ethylene polymer;

wherein an amount of ethylene in the initiator stream based on an amount of ethylene in the olefin stream is in any suitable range or any range disclosed herein, e.g., from 0.01 to 2 wt. %, from 0.01 to 1 wt. %, from 0.2 to 1 wt. %, from 0.01 to 0.5 wt. %, or from 0.05 to 0.2 wt. %.

Aspect 2. The method defined in aspect 1, wherein the initiator stream comprises an initiator mixture containing the initiator compound and a diluent, wherein the initiator mixture contains any suitable amount of the initiator compound or any amount disclosed herein, e.g., from 0.5 to 40 wt. %, from 1 to 35 wt. %, from 2 to 25 wt. %, or from 3 to 20 wt. % of the initiator compound, based on the total weight of the initiator mixture.

Aspect 3. The method defined in aspect 1 or 2, wherein the initiator stream comprises any suitable amount of ethylene or an amount in any range disclosed herein, e.g. from 10 to 99 wt. %, from 15 to 90 wt. %, from 20 to 80 wt. %, or from 70 to 98 wt. % ethylene, based on the total weight of the initiator stream.

Aspect 4. The method defined in any one of the preceding aspects, wherein a linear velocity of the initiator stream through the initiator nozzle is any suitable velocity or any velocity disclosed herein, e.g. from 5 to 25 ft/sec, from 10 to 20 ft/sec, from 5 to 18 ft/sec, or from 7 to 16 ft/sec.

Aspect 5. The method defined in any one of the preceding aspects, wherein a mass flow rate of the initiator stream through the initiator nozzle is in any suitable range or any range disclosed herein, e.g., from 5 to 500 lb/hr, from 20 to 200 lb/hr, or from 5 to 50 lb/hr.

Aspect 6. The method defined in any one of the preceding aspects, wherein the initiator compound comprises any suitable peroxide compound or any peroxide compound disclosed herein.

Aspect 7. The method defined in any one of aspects 2-6, wherein the diluent comprises any suitable hydrocarbon compound or any hydrocarbon compound disclosed herein.

Aspect 8. The method defined in any one of the preceding aspects, wherein a flow of the initiator compound through the initiator nozzle is pulsing, and a period of time in which there is no flow of the initiator compound through the initiator nozzle is any suitable time period or any time period disclosed herein, e.g., less than or equal to 5 sec, less than or equal to 3 sec, less than or equal to 1 sec, or less than or equal to 0.5 sec.

Aspect 9. The method defined in any one of the preceding aspects, wherein the ethylene polymer comprises low density polyethylene (LDPE).

Aspect 10. The method defined in any one of the preceding aspects, wherein the comonomer is present in step (c).

Aspect 11. The method defined in any one of aspects 1-10, wherein the comonomer is present in step (b).

Aspect 12. The method defined in any one of aspects 1-10, wherein the comonomer is introduced into the reactor separately from ethylene.

Aspect 13. The method defined in any one of aspects 1-8 or 10-12, wherein the comonomer comprises any suitable comonomer or any comonomer disclosed herein, e.g., acrylic acid, methyl acrylate, ethyl acrylate, vinyl acetate, propylene, or any combination thereof.

Aspect 14. The method defined in any one of the preceding aspects, wherein a temperature of the ethylene (or the initiator stream) in step (a) is in any suitable range or in any range disclosed herein, e.g., from 5 to 95° C., from 15 to 80° C., from 20 to 70° C., or from 20 to 60° C.

Aspect 15. The method defined in any one of the preceding aspects, wherein the reactor contains two or more initiator nozzles and two or more olefin nozzles.

Aspect 16. The method defined in any one of the preceding aspects, wherein the reactor contains two or more reaction zones.

Aspect 17. The method defined in aspect 16, wherein a temperature in each reaction zone is independent.

Aspect 18. The method defined in aspect 16 or 17, wherein at least two reaction zones contain (or each reaction zone contains) an initiator nozzle.

Aspect 19. The method defined in any one of the preceding aspects, wherein the polymerizing in step (c) is performed in the presence of a chain transfer agent.

Aspect 20. The method defined in any one of the preceding aspects, wherein the high pressure polymerization conditions comprise a polymerization pressure in any suitable range or in any range disclosed herein, e.g., from 10,000 to 50,000 psig (from 69 to 345 MPa), from 10,000 to 35,000 psig (from 69 to 241 MPa), or from 15,000 to 28,000 psig (from 103 MPa to 193 MPa).

Aspect 21. The method defined in any one of the preceding aspects, wherein the high pressure polymerization conditions comprise a polymerization temperature in any suitable range or any range disclosed herein, e.g., from 125 to 350° C., from 150 to 315° C., or from 165 to 315° C.

Aspect 22. The method defined in any one of the preceding aspects, wherein the reactor is an autoclave reactor, a tubular reactor, or a combination of a tubular and an autoclave reactor.

Aspect 23. The method defined in any one of aspects 1-22, further comprising a step of continuously discharging the ethylene polymer from the reactor.

Aspect 24. The method defined in any one of aspects 1-22, further comprising a step of discontinuously discharging the ethylene polymer from the reactor.

Aspect 25. The method defined in any one of the preceding aspects, further comprising a step of discharging any suitable amount or an amount of ethylene polymer in any range disclosed herein from the reactor per hour, e.g., from 5 to 60 MT/hr, from 5 to 20 MT/hr, or from 10 to 35 MT/hr.

Aspect 26. The method defined in any one of the preceding aspects, wherein the polymerizing in step (c) is performed in the presence of an inhibitor.

Aspect 27. The method defined in any one of the preceding aspects, wherein the reactor is an autoclave reactor.

Aspect 28. The method defined in aspect 27, wherein the autoclave reactor has any suitable L/D or a L/D in any range disclosed herein, e.g., from 1.5 to 15:1, from 5:1 to 15:1, or from 6:1 to 12:1.

Aspect 29. An injection nozzle comprising:
(i) a feed section comprising:
an inner flow channel directing a flow of an initiator stream;
at least two outer flow channels directing flows of an olefin stream; and
a center portion configured to prevent contacting of the initiator stream with the olefin stream, wherein the center portion is further configured to be in contact with a reactor bore (or housing) through a wall of a high pressure olefin polymerization reactor; and
(ii) a mixing section comprising a diverting port in the center portion configured to divert a fraction of the olefin stream from at least one of the at least two outer flow channels to enter the inner flow channel and mix with the initiator stream.

Aspect 30. The injection nozzle defined in aspect 29, wherein the outer flow channel that feeds the diverting port is above (or vertically above) the inner flow channel.

Aspect 31. The injection nozzle defined in aspect 29 or 30, wherein the injection nozzle is further configured to discharge the olefin stream into the high pressure olefin polymerization reactor after the mixing section.

Aspect 32. The injection nozzle defined in any one of aspects 29-31, wherein the injection nozzle is further configured to discharge a mixture of the fraction of the olefin stream and the initiator stream from the inner flow channel into the high pressure olefin polymerization reactor after the mixing section.

Aspect 33. The injection nozzle defined in aspect 31 or 32, wherein the injection nozzle is configured to discharge the olefin stream and to discharge the mixture of the fraction of the olefin stream and the initiator stream into the high pressure olefin polymerization, independently, at any suitable velocity or any velocity disclosed herein, e.g. from 5 to 60 ft/sec, from 10 to 55 ft/sec, or from 15 to 50 ft/sec.

Aspect 34. The injection nozzle defined in any one of aspects 29-33, wherein a cross-sectional area ratio of the at least two outer flow channels to the inner flow channel in the feed section is any suitable ratio or a ratio in any range disclosed herein, e.g., from 10:1 to 150:1, from 15:1 to 80:1, from 15:1 to 50:1, or from 20:1 to 60:1.

Aspect 35. The injection nozzle defined in any one of aspects 29-34, wherein a cross-sectional area ratio of the at least two outer flow channels in the feed section to the diverting port in the mixing section is any suitable ratio or a ratio in any range disclosed herein, e.g., from 15:1 to 150:1, from 15:1 to 80:1, from 20:1 to 75:1, or from 25:1 to 55:1.

Aspect 36. The injection nozzle defined in any one of aspects 29-35, wherein the injection nozzle further comprises a flow obstruction (e.g., a dam) configured to divert the fraction of the olefin stream into the diverting port.

Aspect 37. The injection nozzle defined in aspect 36, wherein a cross-sectional area ratio of the at least two outer flow channels in the feed section to the area of the flow obstruction in the mixing section is any suitable ratio or a ratio in any range disclosed herein, e.g., from 4:1 to 25:1, from 4:1 to 15:1, from 5:1 to 20:1, or from 6:1 to 12:1.

Aspect 38. The injection nozzle defined in any one of aspects 29-37, wherein a mass flow rate ratio of a total flow rate of the olefin stream in the feed section to a flow rate of the fraction of the olefin stream in the diverting port is any suitable ratio or a ratio in any range disclosed herein, e.g., from 30:1 to 400:1, from 30:1 to 150:1, from 35:1 to 100:1, or from 35:1 to 80:1.

Aspect 39. The injection nozzle defined in any one of aspects 29-38, wherein the fraction of the olefin stream exiting the diverting port enters the inner flow channel at any suitable angle or an angle in any range disclosed herein, e.g., from 15 to 90°, from 15 to 75°, from 15 to 60°, from 25 to 60°, or from 25 to 50°.

Aspect 40. The injection nozzle defined in any one of aspects 29-39, wherein the injection nozzle is further configured for a pressure drop across the injection nozzle for the outer flow channels that is greater than for the inner flow channel by any suitable pressure or a pressure in any range disclosed herein, e.g., at least 15 psig, at least 20 psig, at least 50 psig, or at least 100 psig, and less than or equal to 250 psig, less than or equal to 200 psig, or less than or equal to 150 psig.

Aspect 41. A polymerization reactor system comprising:
the high pressure olefin polymerization reactor; and
the injection nozzle defined in any one of aspects 29-40, wherein the injection nozzle is integrated in the reactor bore (or housing) and extends through the wall of the high pressure olefin polymerization reactor.

Aspect 42. The system defined in aspect 41, wherein the system further comprises an initiator feed port in communication with the inner flow channel, wherein the initiator feed port introduces the flow of the initiator stream into the inner flow channel.

Aspect 43. The system defined in aspect 41 or 42, wherein the system further comprises an olefin feed port in communication with the at least two outer flow channels, wherein the olefin feed port introduces the flows of the olefin stream into the at least two outer flow channels.

Aspect 44. The system defined in any one of aspects 41-43, wherein the injection nozzle is further configured to introduce the olefin stream flush with an inner wall of the high pressure olefin polymerization reactor.

Aspect 45. The system defined in any one of aspects 41-44, wherein the injection nozzle is further configured to introduce the initiator stream from flush with an inner wall of the high pressure olefin polymerization reactor up to a distance within the reactor of up to 15%, up to 10%, or up to 5%, of the radius of the reactor.

We claim:
1. A method for operating a high pressure olefin polymerization reactor, the method comprising:
(a) introducing an initiator stream through an initiator nozzle into the reactor, the initiator stream comprising ethylene and an initiator compound;

(b) introducing an olefin stream through an olefin nozzle into the reactor, the olefin stream comprising ethylene and optionally a comonomer; and (c) polymerizing ethylene and optionally the comonomer in the presence of the initiator stream in the reactor under high pressure polymerization conditions to produce an ethylene polymer;

wherein an amount of ethylene in the initiator stream based on an amount of ethylene in the olefin stream is from 0.01 to 2 wt. %; and wherein the reactor is an autoclave reactor.

2. The method of claim 1, wherein:
the initiator stream contains from 10 to 99 wt. % ethylene; and
the initiator stream comprises an initiator mixture containing a diluent and from 0.5 to 40 wt. % of the initiator compound.

3. The method of claim 2, wherein:
the initiator compound comprises a peroxide compound; and
the diluent comprises a hydrocarbon compound.

4. The method of claim 3, wherein:
a temperature of the initiator stream in step (a) is from 5 to 95° C.; and
a linear velocity of the initiator stream through the initiator nozzle is from 5 to 25 ft/sec.

5. The method of claim 1, wherein the high pressure polymerization conditions comprise:
a polymerization temperature from 125 to 350° C.; and
a polymerization pressure from 10,000 to 50,000 psig (from 69 to 345 MPa).

6. The method of claim 1, wherein a flow of the initiator compound through the initiator nozzle is pulsing, and a period of time in which there is no flow of the initiator compound through the initiator nozzle less than or equal to 5 sec.

7. The method of claim 1, wherein the reactor contains:
two or more reaction zones;
two or more initiator nozzles; and
two or more olefin nozzles.

8. The method of claim 1, wherein the ethylene polymer comprises low density polyethylene (LDPE).

9. The method of claim 1, wherein the comonomer is present in step (c).

10. A polymerization reactor system comprising:
a high pressure olefin polymerization reactor; and
an injection nozzle integrated into a reactor bore of the reactor and extending through a wall of the reactor, the injection nozzle comprising:
(i) a feed section comprising:
an inner flow channel directing a flow of an initiator stream;
at least two outer flow channels directing flows of an olefin stream; and
a center portion configured to prevent contacting of the initiator stream with the olefin stream, wherein the center portion is further configured to be in contact with the reactor bore of the reactor; and
(ii) a mixing section comprising a diverting port in the center portion configured to divert a fraction of the olefin stream from at least one of the at least two outer flow channels to enter the inner flow channel and mix with the initiator stream.

11. The system of claim 10, wherein:
a cross-sectional area ratio of the at least two outer flow channels to the inner flow channel in the feed section is from 10:1 to 150:1; and
a cross-sectional area ratio of the at least two outer flow channels in the feed section to the diverting port in the mixing section is from 15:1 to 150:1.

12. The system of claim 10, wherein:
the injection nozzle further comprises a flow obstruction configured to divert the fraction of the olefin stream into the diverting port; and
a cross-sectional area ratio of the at least two outer flow channels in the feed section to the area of the flow obstruction in the mixing section is from 4:1 to 25:1.

13. The system of claim 10, wherein the fraction of the olefin stream exiting the diverting port enters the inner flow channel at an angle from 15 to 90°.

14. The system of claim 10, wherein the injection nozzle is further configured for a pressure drop across the injection nozzle for the outer flow channels that is greater than for the inner flow channel by from 15 psig to 250 psig.

15. The system of claim 10, wherein the reactor is an autoclave reactor.

16. The system of claim 10, wherein the injection nozzle is further configured to:
discharge the olefin stream into the reactor after the mixing section at a linear velocity in a range from 5 to 60 ft/sec; and
discharge a mixture of the fraction of the olefin stream and the initiator stream from the inner flow channel into the reactor after the mixing section at a linear velocity in a range from 5 to 30 ft/sec.

17. The system of claim 10, wherein the system further comprises:
an initiator feed port in communication with the inner flow channel, wherein the initiator feed port introduces the flow of the initiator stream into the inner flow channel; and
an olefin feed port in communication with the at least two outer flow channels, wherein the olefin feed port introduces the flows of the olefin stream into the at least two outer flow channels.

18. The system of claim 10, wherein the injection nozzle is further configured to:
introduce the olefin stream flush with an inner wall of the reactor; and
introduce the initiator stream from flush with the inner wall of the reactor up to a distance within the reactor of up to 15% of a radius of the reactor.

19. An injection nozzle comprising:
(i) a feed section comprising:
an inner flow channel directing a flow of an initiator stream;
at least two outer flow channels directing flows of an olefin stream; and
a center portion configured to prevent contacting of the initiator stream with the olefin stream, wherein the center portion is further configured to be in contact with a reactor bore through a wall of a high pressure olefin polymerization reactor; and
(ii) a mixing section comprising a diverting port in the center portion configured to divert a fraction of the olefin stream from at least one of the at least two outer flow channels to enter the inner flow channel and mix with the initiator stream.

20. The injection nozzle of claim 19, wherein:
a cross-sectional area ratio of the at least two outer flow channels to the inner flow channel in the feed section is from 10:1 to 150:1; and a cross-sectional area ratio of the at least two outer flow channels in the feed section to the diverting port in the mixing section is from 15:1 to 150:1.

21. The injection nozzle of claim 19, wherein:
the injection nozzle further comprises a flow obstruction configured to divert the fraction of the olefin stream into the diverting port; and
a cross-sectional area ratio of the at least two outer flow channels in the feed section to the area of the flow obstruction in the mixing section is from 4:1 to 25:1.

22. The injection nozzle of claim 19, wherein the fraction of the olefin stream exiting the diverting port enters the inner flow channel at an angle from 15 to 90°.

23. The injection nozzle of claim 19, wherein the injection nozzle is further configured for a pressure drop across the injection nozzle for the outer flow channels that is greater than for the inner flow channel by from 15 psig to 250 psig.

24. A method for operating a high pressure olefin polymerization reactor, the method comprising:
(a) introducing an initiator stream through an initiator nozzle into the reactor, the initiator stream comprising:
from 10 to 99 wt. % ethylene; and
an initiator mixture containing a diluent and from 0.5 to 40 wt. % of an initiator compound; wherein:
the diluent comprises a hydrocarbon compound; and
the initiator compound comprises a peroxide compound;
(b) introducing an olefin stream through an olefin nozzle into the reactor, the olefin stream comprising ethylene and optionally a comonomer; and
(c) polymerizing ethylene and optionally the comonomer in the presence of the initiator stream in the reactor under high pressure polymerization conditions to produce an ethylene polymer;
wherein an amount of ethylene in the initiator stream based on an amount of ethylene in the olefin stream is from 0.01 to 2 wt. %.

25. The method of claim 24, wherein a linear velocity of the initiator stream through the initiator nozzle is from 5 to 25 ft/sec.

26. The method of claim 24, wherein the ethylene polymer comprises low density polyethylene (LDPE).

* * * * *